United States Patent
Phelan et al.

(10) Patent No.: US 11,354,670 B2
(45) Date of Patent: Jun. 7, 2022

(54) FRAUD PREVENTION EXCHANGE SYSTEM AND METHOD

(71) Applicant: Trans Union LLC, Chicago, IL (US)

(72) Inventors: Pat Phelan, Chicago, IL (US); Lee Cookman, Chicago, IL (US); Jenny Runde, Chicago, IL (US); Bala K. Kumar, Chicago, IL (US); Jason Ryan, Chicago, IL (US); Anthony Carroll, Chicago, IL (US); Diarmuid Thoma, Chicago, IL (US); Jeff Brown, Chicago, IL (US)

(73) Assignee: Trans Union LLC, Chicago, IL (US)

( * ) Notice: Subject to any disclaimer, the term of this patent is extended or adjusted under 35 U.S.C. 154(b) by 252 days.

(21) Appl. No.: 16/287,799

(22) Filed: Feb. 27, 2019

(65) Prior Publication Data

US 2019/0266609 A1 Aug. 29, 2019

Related U.S. Application Data

(60) Provisional application No. 62/636,017, filed on Feb. 27, 2018.

(51) Int. Cl.
*G06Q 40/00* (2012.01)
*G06Q 20/40* (2012.01)
(Continued)

(52) U.S. Cl.
CPC ....... *G06Q 20/4016* (2013.01); *G06F 16/901* (2019.01); *G06Q 20/3224* (2013.01)

(58) Field of Classification Search
USPC .......... 705/44, 39, 38, 37, 41, 26.4, 45; 709/226; 719/328; 715/753; 726/9, 6;
(Continued)

(56) References Cited

U.S. PATENT DOCUMENTS 8,145,562 B2 * 3/2012 Wasserblat ............ G06Q 40/02 705/38
9,785,944 B2 * 10/2017 Bruesewitz .......... G06Q 20/403
(Continued)

FOREIGN PATENT DOCUMENTS

WO WO 2016/055930 A1 4/2016

OTHER PUBLICATIONS

Leveraging Cellular Infrastructure to Improve Fraud Prevention; 2009 Annual Computer Security Applications Conference (pp. 350-359); Park, F.S. Gangakhedkar, C. Traynor, P.; Dec. 7, 2009. (Year: 2009).*
(Continued)

*Primary Examiner* — Tien C Nguyen
(74) *Attorney, Agent, or Firm* — William J. Lenz; Neal, Gerber & Eisenberg LLP

(57) ABSTRACT

A fraud prevention exchange system is provided for gathering transaction data for centralized review. The system comprises a database for storing transaction data received from participating lenders and a data retrieval and processing engine for receiving transaction data including a first transaction status code and one or more transaction attributes for a pending transaction from a first participating lender; storing the first transaction status code in association with the transaction attribute(s) in the database; receiving a transaction verification request comprising at least one of the transaction attribute(s) from a second, different participating lender; determining one or more risk alerts for the at least one of the transaction attribute(s) based on the first transaction status code and one or more prior transaction status codes previously stored in the database in association with said attribute; and transmit said risk alert(s) to the second participating lender.

20 Claims, 4 Drawing Sheets

(51) Int. Cl.
*G06F 16/901* (2019.01)
*G06Q 20/32* (2012.01)

(58) Field of Classification Search
USPC .................................................. 235/375, 380
See application file for complete search history.

(56) References Cited

U.S. PATENT DOCUMENTS

| | | |
|---|---|---|
| 9,842,338 B1 * | 12/2017 | Shukla .................. G06F 16/955 |
| 2013/0080283 A1 | 3/2013 | Hogan |
| 2014/0101029 A1 * | 4/2014 | Walker .................... G06Q 40/00 |
| | | 705/38 |
| 2015/0012420 A1 * | 1/2015 | Kim ........................ G06Q 20/14 |
| | | 705/40 |
| 2017/0032374 A1 * | 2/2017 | Doddamani ....... G06Q 20/4016 |
| 2017/0091773 A1 | 3/2017 | Amancherla et al. |
| 2017/0357977 A1 * | 12/2017 | Pitz ...................... G06Q 20/202 |
| 2018/0005235 A1 * | 1/2018 | Thorne .............. G06Q 20/3829 |

OTHER PUBLICATIONS

The United States Patent and Trademark Office, International Search Report and Written Opinion for International Application No. PCT/US19/19855 (dated May 7, 2019).

* cited by examiner

FRAUD PREVENTION EXCHANGE SYSTEM AND METHOD

CROSS-REFERENCE TO RELATED APPLICATIONS

This application claims priority to U.S. Provisional Application No. 62/636,017, entitled "Fraud Prevention Exchange System" and filed on Feb. 27, 2018, the contents of which are incorporated by reference herein in their entirety.

TECHNICAL FIELD

This invention relates to a fraud prevention exchange system and method that provides an omnichannel, real-time verification service to participating network members.

BACKGROUND OF THE INVENTION

Financial services organizations compete on their ability to deliver simple and speedy credit and loan origination processes, and giving consumers access to funds as quickly as possible. However, the credit and lending market today has a significant level of unmitigated fraud loss risk. For example, in many cases, especially in the financial technology sub-segment, fraudulent consumers are applying for and funding multiple loans within a day or two, which is referred to as "fraudulent loan stacking." The lenders are unable to determine that these consumers have applied for and/or opened a similar product, at times with no intent to ever repay. Pervasive trends of fraudsters applying for several products in a short span of time leaves lenders at a heightened risk, especially to online fraud losses. Recently, several fraud cases have also shown an individual using multiple stolen and synthetic identities to apply for credit and lending products quickly, having the same "fraudulent loan stacking" effect but attempting to avoid detection by using different identity data combinations. Although there are products that assess risk and provide alerts, there is a lack of channel and product-level transparency as well as an issue of reporting latency in these existing tools. Further, beyond the personal loans use case, fraud risk patterns may be observed across the gambit of credit and lending industries (including, but not limited to credit cards, unsecured personal loans, and auto loans) and application channels (including, but not limited to web, mobile, bank branch, retail point of sale, and dealership).

In addition to the lack of transparency into the velocity of transactions across products and channels in the marketplace, credit and lending firms do not have access to sufficient suspected reported fraud reporting. As a result, when one lender encounters an instance of fraud, subsequent lenders are unaware when the same identity and/or device elements are used to apply quickly for additional credit and lending products.

Therefore, there exists a need for a fraud loss mitigation tool that may be accessed during the credit and lending originations process and harnesses the power of an exchange network of peer financial institutions without compromising the ability of these businesses to compete fairly in this market.

SUMMARY OF THE INVENTION

The fraud prevention exchange system and method of the present disclosure provides a tool for flagging transactions comprising elements that (i) exhibit heightened velocity in terms of the rate at which transactions having those elements are occurring within a predefined time period and/or (ii) have been reported in a prior fraudulent transaction within the exchange system or network. More specifically, the fraud prevention exchange system and method combines the power of digital verification and identity solutions products with the establishment of a private collaboration between of a group of lenders sharing data for a common interest, i.e. to reduce losses and optimize profits by limiting fraud exposure.

In one embodiment, the fraud prevention exchange system provides a shared data pool that is limited to participating members while maintaining member anonymity. The system is updated and monitored by a host. Participating members can use the fraud prevention exchange system of the present disclosure to evaluate fraud risk associated with a transaction through alerts rendered within the exchange solution. The members will also use the exchange system to contribute, to the host, status updates indicating the lifecycle of an application (e.g., placed, started, completed, fulfilled, etc.), as well as information on any known fraud (e.g., rejected fraud, reported fraud, etc.) associated with a specific consumer (borrower) or transaction element. The host will manage this network velocity data, fraud data, and other data from additional proprietary sources to provide real-time transaction risk assessment data.

Such a configuration can help reduce bad loan outcomes and prevent or avoid online fraud by sharing industry information without releasing proprietary data to competitors.

DETAILED DESCRIPTION OF THE INVENTION

Figure 1:
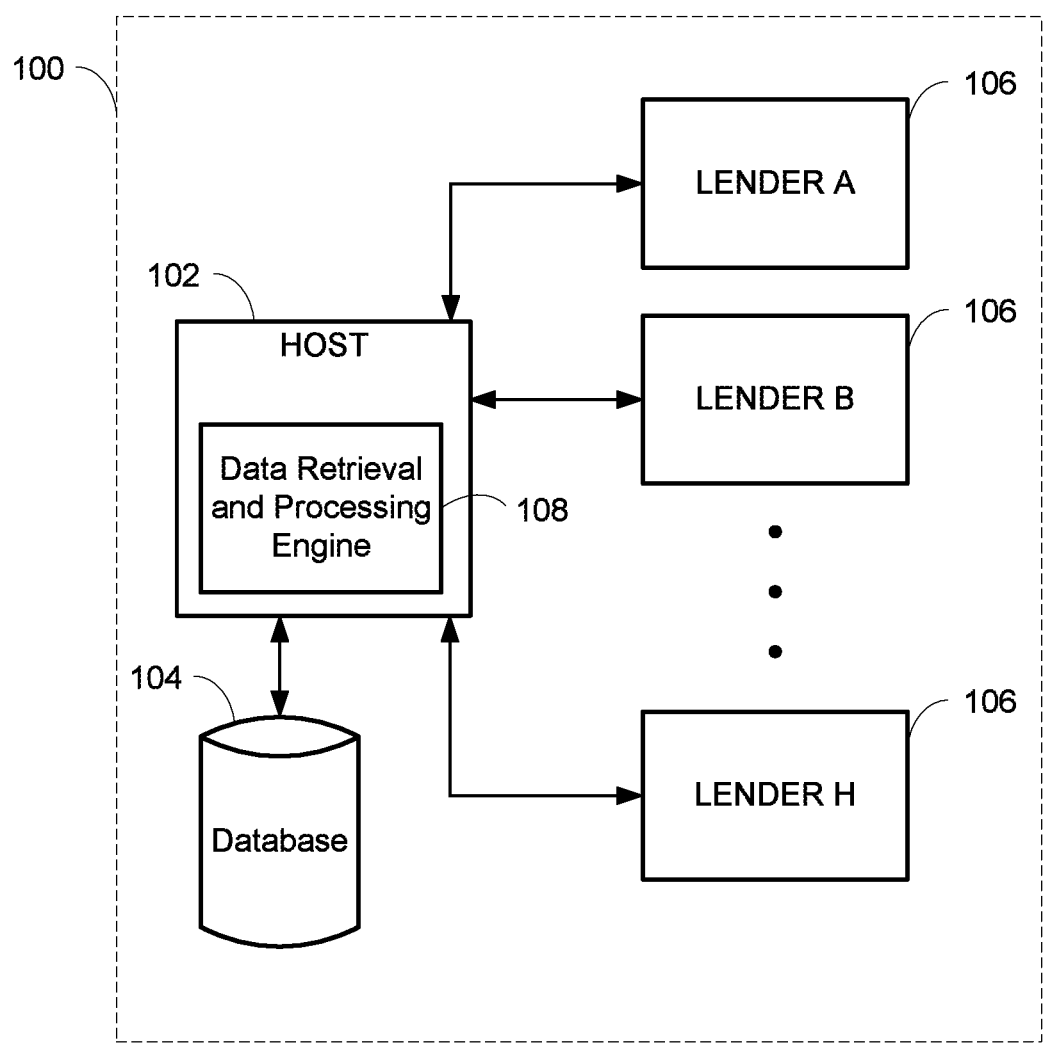
FIG. 1 is a block diagram illustrating a fraud prevention exchange system according to certain embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

It should also be noted that the disclosures made in this specification are in accordance with the principles of the embodiments(s), which are intended to be disclosed or interpreted to their broadest extent under the patent laws, and while such disclosure may describe or otherwise cover subject matter that may be regulated by other existing laws or regulations, including, without limitation, the Fair Credit Reporting Act (FCRA) or the Equal Credit Opportunity Act (ECOA), the Gramm-Leach-Bliley Act (GLBA), etc., nothing in this disclosure is intended to suggest or imply non-compliance with any such law or regulation by the assignee. For example, in embodiments, the fraud prevention exchange system of the present disclosure does not incorporate consumer reporting data and the network cannot be used for adverse action. Customers will obtain fact alerts through the digital verification product; however it is critical that customers must also contribute data as well. Such a configuration provides insight at all key points in the transaction.

Various embodiments of the fraud prevention exchange system enable a group of participating members to gain exclusive access to insights on behavior associated with attributes observed in transactions of end users across a member network. More specifically, the fraud prevention exchange system of the present disclosure can be configured to, among other things, (1) match application details and perform a full digital verification assessment of a borrower, (2) analyze velocity across the network, and (3) provide an overall risk summary with detailed supporting data. The network includes members that opt in and share limited data on a central platform. The members are typically entities that handle financial transactions, such as lenders or consumer lending companies. The data is private and only shared among other members. In some cases, the data is used to flag multiple loans to the same person in a short timeframe. In other cases, the data is used to flag identity elements previously associated with fraud. Using the techniques described herein, the fraud prevention exchange system can operate in a feedback loop that allows it to continually improve over time and provide real time, or near real time, information to network members.

FIG. 1 illustrates one embodiment of a fraud prevention exchange system 100 for providing real-time alerts to a member of the exchange system (e.g., a lender) regarding velocity and reported fraud alerts or facts associated with a given transaction. As used herein, "real-time" alerts are provided within seconds or less (e.g., <1 to 10 seconds) of receiving a request or call for verification, or otherwise receiving information from a member regarding a pending transaction. Also, as used herein, "transaction" refers to the end-to-end consumer experience, which may start with, for example, selecting an option to apply for a product and may end with, for example, a final decision (e.g., decline or approval) related to the product. As shown in FIG. 1, the fraud prevention exchange system 100 includes a host 102 for receiving, monitoring, and transmitting transaction information in real-time, a database 104 for storing transaction information, and a plurality of participating lenders A-H 106 (also referred to herein as "participating members" or "participating entities"). As will be appreciated, the number of participating lenders 106 will vary and can include more or fewer than the number shown in FIG. 1. In embodiments, the components of the system 100 may interact with each other via a wired or wireless communication network (more details provided below in discussion of FIG. 4). In one embodiment, the participating lenders 106 that sign up for membership in the fraud prevention exchange system 100 interact with, or integrate into their systems, a digital verification component provided by the host 102. The digital verification component can be a software program designed to provide greater visibility into devices, web browsing behaviors, and digital or device identities associated with borrowers or other customers of the lenders 106. Each of the participating members 106 may use an Application Programming Interface (API) installed on, or accessible via, their respective computing devices (e.g., computing device 400 shown in FIG. 4) to interface with the system 100, including to provide information to and obtain alerts or facts from the system 100.

As used herein, the term "velocity" refers to rapidity, or the speed at which transactions are happening, and a "velocity alert" is issued when the system 100 identifies heightened or abnormally high activity levels for given transaction attributes across the Exchange network, based on information provided by the members 106. Velocity alerts are not designed to provide consumer reporting on credit inquiries or funded loans. Instead, velocity alerts provide an indication of observed fraudulent behavior or a heightened risk for fraud based on attempts to obtain funds from multiple lenders quickly. More specifically, a velocity alert for a currently pending transaction indicate that there are a high number of transactions having matching transaction attributes across the Exchange Network within a specified period of time.

In embodiments, velocity is derived based on a preselected set of transaction attributes or data elements that can help identify where the same identity elements and/or devices are being employed through various tactics to acquire several financial products quickly (usually with no intent to repay). The preselected attributes can include, for example, digital attributes (e.g., device tag information, Internet Protocol ("IP") address, or other attributes related to device identity), location attributes (e.g., a city associated with the IP address, a country associated with the IP address, or other attributes related to a geographical location), and personal attributes (e.g., email address, social security number ("SSN"), phone number, name, date of birth, home address, or other attributes related to personal identity). In embodiments, the digital attributes may be used to detect a returning device and/or a device that is connected to the returning device or other known device. In some embodiments, the various transaction attributes are weighted using a preconfigured algorithm in order to determine whether a "match" has been made between a pending transaction and previous transactions throughout the Exchange network for the purpose of issuing a velocity alert. That is, the velocity alert does not measure the velocity of an identity, but rather, the velocity of various transaction attributes used in transactions across the Network.

According to embodiments, the velocity alert may identify a velocity risk level (e.g., high velocity or medium velocity) based on available transaction information, such as, for example, transaction status codes (e.g., Placed, Rejected Fraud, Completed, Reported Fraud, etc., as described in more detail below), provided to the Network by the plurality of members 106. In some embodiments, the velocity risk levels are driven by the number of transaction status codes present in the Network for the relevant transaction attributes, such as, for example, a total number of transaction status codes (e.g., of any type) and/or a number of transaction status codes of a certain type (e.g., Rejected or Reported Fraud) within a span of time (e.g. 48 hours, 15 days, etc.). In some embodiments, a weighted scale may be applied to the transaction status codes associated with the matched attributes in order to determine the velocity risk level. For example, Rejected and Reported Fraud codes may be weighted higher than Placed and Completed. Further, the velocity risk levels can be calculated over a predefined period of time. In some embodiments, the system 100 provides velocity alerts based on transaction information collected over predefined time periods (e.g., 15 or 30 days) in order to give views into activity over various time periods. In some cases, the predefined time periods may be user-configurable to allow each lender 106 to select the time periods that are most relevant to their business cycle (e.g., number of days in application process) or other interests.

In some embodiments, the velocity alert may be selected from one of four preselected messages based on a combination of the weighted calculations and comparisons to thresholds within each time period. For example, the velocity alert may be set to "long term velocity high" if the number of transaction status codes within a first predefined time period exceeds a first threshold. As another example, the velocity alert may be set to "long term velocity medium" if the number of transaction status codes within the first predefined time period exceeds a second threshold but is below the first threshold. Similarly, the velocity alert may be set to "short term velocity high" if the number of transaction status codes within a second predefined time period exceeds a third threshold, or set to "short term velocity medium" if the number of transaction status codes within the second predefined time period exceeds a fourth threshold but is below the third threshold. In some embodiments, the third threshold may be smaller than or equal to the first threshold. In some embodiments, the fourth threshold may be smaller than or equal to the second threshold.

As also used herein, the term "reported fraud" refers to whether the transaction has transaction attributes that have been matched to those previously reported in a suspected or suspicious fraudulent transaction by another member of the exchange network. It should be noted that reported fraud does not indicate a confirmed fraud. Instead, a reported fraud alert indicates that one or more prior transactions having one or more of the same attributes appearing in the current transaction was flagged or reported by another member as being fraudulent based on that member's criteria for determining fraud. Thus, reported fraud can be an indication that the given transaction attributes have a "bad" or suspicious history.

In embodiments, the transaction attributes used to match a pending transaction to previous transactions, or otherwise identify a reported fraud alert, may be the same as or similar to the attributes used to determine a velocity alert (e.g., SSN, email address, device tag, IP address and/or information associated therewith, etc.). Further, a reported fraud alert may be derived from certain transaction status codes, such as, e.g., Rejected or Reported Fraud, that were received from network members 106 for transaction attributes that match those associated with a currently pending transaction. For example, the reported fraud alert may be based on a percentage of matching transactions that are associated with a Reported or Rejected Fraud status code, or are otherwise labeled as having "Bad History." In one example embodiment, the reported fraud alert may be triggered if the percentage of matching transactions exceeds a predetermined threshold (e.g., 10 percent, 20 percent, 30 percent, etc.). In another example embodiment, the reported fraud alert may be triggered if there are any reported or rejected fraud facts (e.g., one or more) associated with the matching transaction attributes.

Referring back to FIG. 1, the fraud prevention exchange system database 104 includes or stores transaction information that is accessible to, and populated by, the participating lenders 106. For example, the information stored in database 104 may be a compilation of all transaction information received from the participating lenders 106. In embodiments, the transaction information received from the members 106, such as, e.g., the transaction status codes, can be stored in a first memory location that is configured to allow quick data population, access, and retrieval (e.g., within seconds or less), so that the velocity and reported fraud alerts can be made available in real time (or near real-time). For example, the transaction information can be stored in a table that is built or designed to handle sufficient historic transaction data to power the velocity and reported fraud alerts with real time response capability. In one example, each piece of transaction information is maintained in the table for at least 180 days. In some embodiments, the transaction information is also stored in a second memory location configured for long-term data storage (e.g., 365 days), so that the transaction information can be used to perform system analytics, improve existing algorithms, and/or identify new needs or solutions.

In some embodiments, the database 104 also contains information obtained from external data sources (not shown), such as, for example, one or more proprietary databases associated with the host 102. For example, the information may be obtained from an extended network that includes not only the members 106 but other entities that are customers of, or otherwise associated with, the host 102. In such embodiments, the information output from the database 104 may be a compilation of the transaction information received from the participating lenders 106 and the information received from the external data sources. In some embodiments, the database 104 is included on a server comprising a processor and memory (see, e.g., FIG. 4) and said processor is configured to analyze the information stored in the database 104 in accordance with one or more preconfigured algorithms and provide the output of said algorithm in response to a request for information from one of the lenders 106.

In embodiments, the database 104 is managed by the host 102, and the host 102 is configured to communicate information between the database 104 and the plurality of lenders 106. For example, the plurality of participating lenders 106 may provide information to the host 102 for entry into the database 104 in exchange for access to other information provided to the database 104 by other participating lenders 106. More specifically, the participating lenders 106 may utilize the digital verification component associated with the system 100 and accessible by the lenders 106 each time an application is opened and/or make an API call to request alert information. As shown in FIG. 1, the host 102 includes a data retrieval and processing engine 108, which may receive the requests for borrower and other transaction information from the lenders 106 and retrieve the requested information from the database 104. In some embodiments, the engine 108 is also configured to analyze the data stored in the database 104, using one or more preconfigured algorithms, and determine whether a risk alert should be issued, either for velocity concerns or reported fraud.

Before making a decision to fund a transaction associated with the new application, the lender 106 transmits a transaction status code to the host 102. The transaction status code provides current status information about a specific transaction with a specific borrower or consumer. For example, if the transaction is stopped for fraud, the lender 106 transmits a transaction status code for reporting the fraud (e.g., rejected fraud or reported fraud). Once an initial review of the transaction is completed, the lender 106 transmits a different transaction status code for reporting that the initial review has been completed (e.g., completed). In exchange for providing this information, the participating lenders 106 receive alerts on the real time velocity of transactions across the system 100 that have attributes similar to those associated with a currently-pending transaction and alerts on network-reported fraud that matches attributes associated with the currently pending transaction. Such a configuration enables participating lenders 106 to transmit and access information associated with pending transactions, while maintaining anonymity of member lenders 106.

Figure 3:
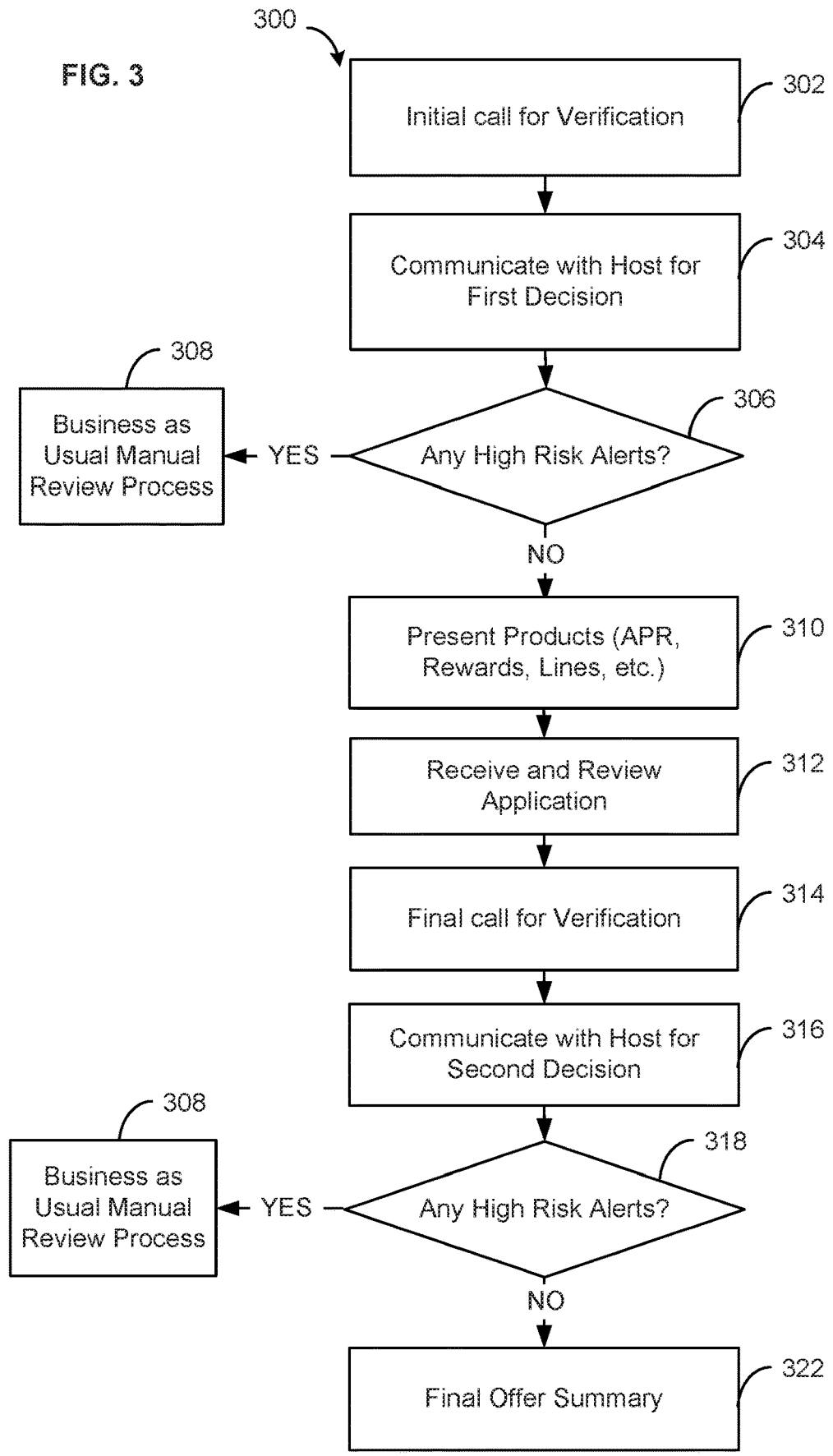
FIG. 3 is a flowchart illustrating a participating lender's interaction with the system of FIG. 1 while transacting with a borrower, in accordance with embodiments.
Figure 4:
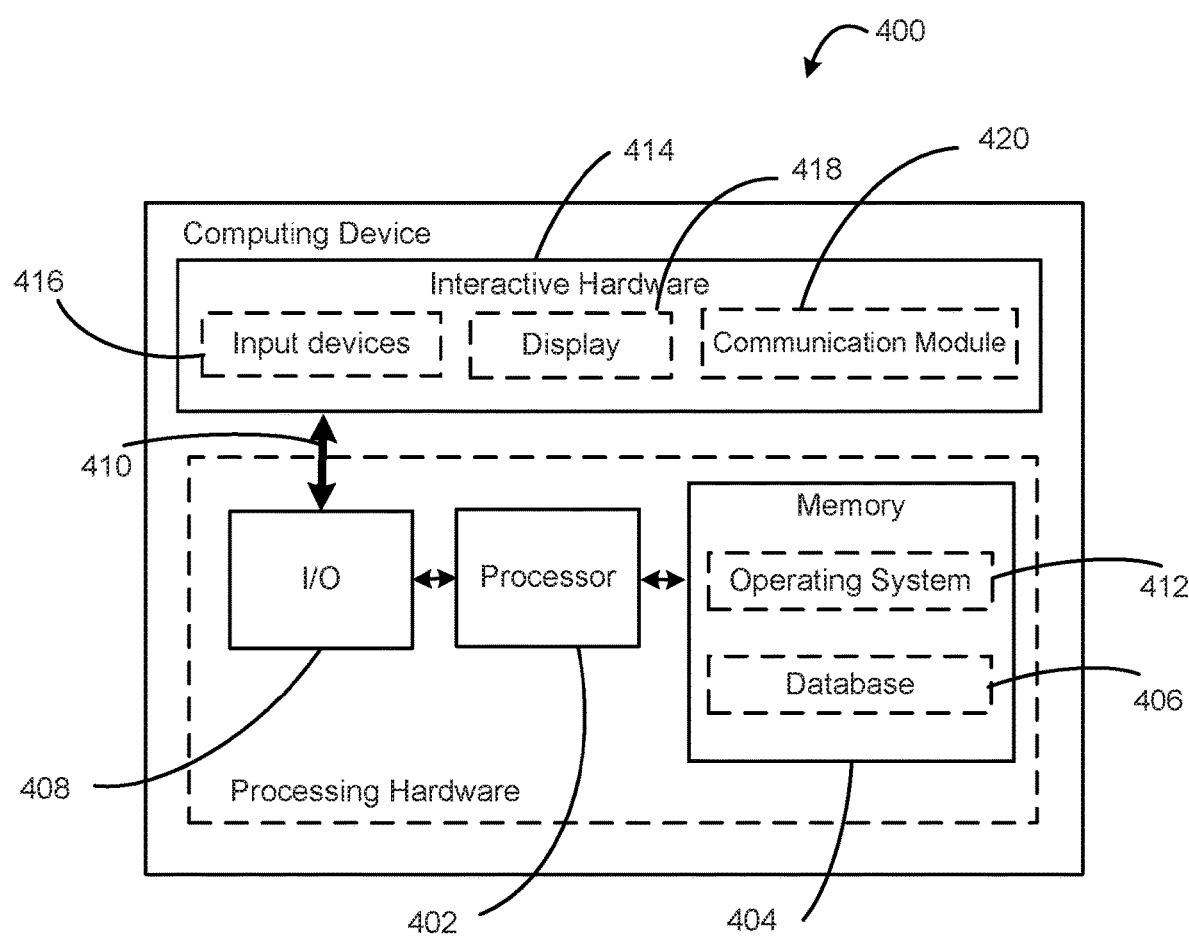
FIG. 4 is a block diagram of one form of a computer or server included in FIG. 1, having a memory element with a computer readable medium for implementing the example operations of FIGS. 2 and/or 3 in accordance with embodiments.

Various components of the system 100 may be implemented using software executable by one or more servers or computers, such as computing device 400 with a processor 402 and memory 404, as shown in FIG. 4, which is described in more detail below. For example, the host 102, the database 104, and each participating lender 106 may include one or more computing devices 400 for interacting with other components of the fraud prevention exchange system 100 and/or implementing one or more of process 200 shown in FIG. 2 and process 300 shown in FIG. 3. In embodiments, the components of the system 100 can be configured to interact with each other and/or carry out the processes 200 and 300 using one or more communication networks, including, for example, a wireless communication network (e.g., WiFi, cellular, etc.) or a wired communication network (e.g., WLAN, etc.). In certain embodiments, participating lender 106 may access the fraud prevention exchange system 100 through a webpage managed by the host 102. In other embodiments, the participating lenders 106 may be required to securely log into the fraud prevention exchange system 100 in order to make data requests and transmit transaction codes.

Various embodiments of the present disclosure include the ability to support multiple channels for the participating lenders 106 to interact with the fraud prevention system 100. More specifically, in certain embodiments the fraud prevention exchange system 100 is accessible through an online self-service system or API associated therewith. In certain embodiments, the fraud prevention exchange system 100 is also accessible through phone or point of sale channels.

Figure 2:
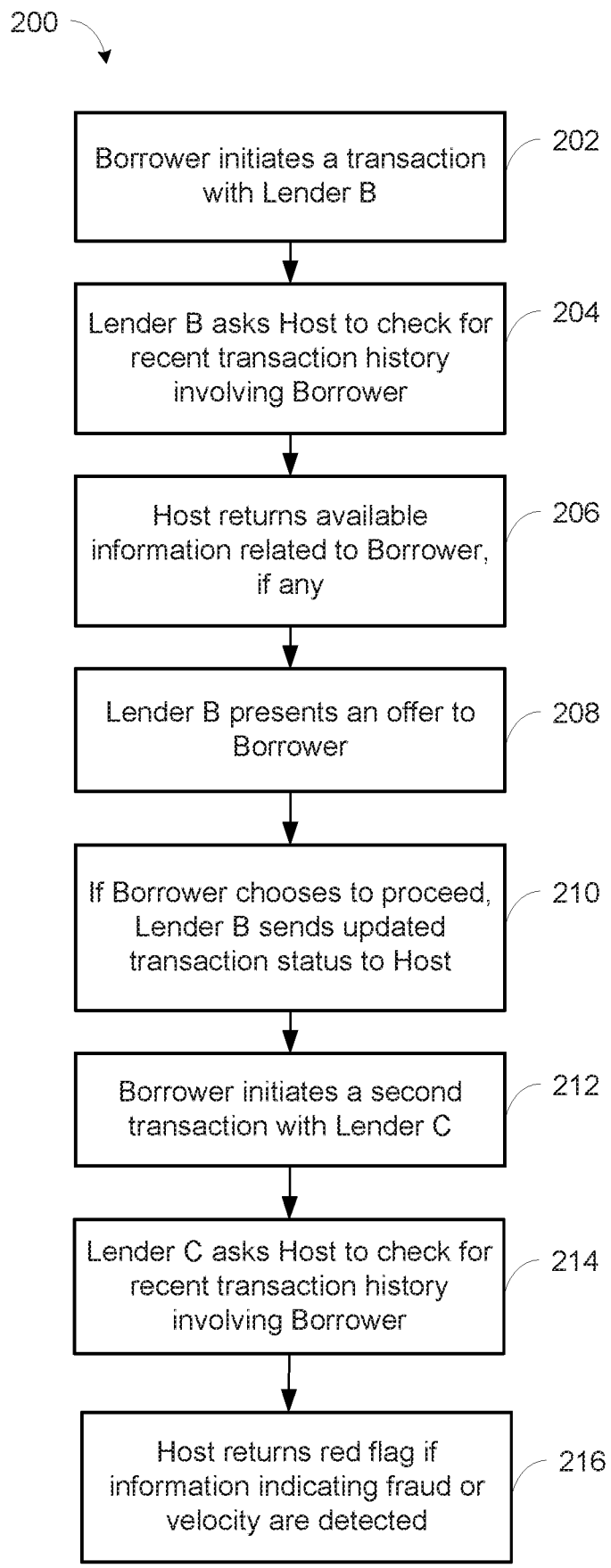
FIG. 2 is a flowchart illustrating multiple participating lender operations using the system of FIG. 1, in accordance with embodiments.

Turning now to FIG. 2, shown is a process 200 for facilitating fraud prevention by providing real time alerts for pending transactions, in accordance with embodiments. The process 200 may be implemented using the fraud prevention exchange system 100, or more specifically, through interactions between various components of the system 100 that are facilitated by software executing on one or more computer processors associated with the components. In the following paragraphs, the process 200 will be described in conjunction with a description of the components of the system 100. For example, the process 200 includes interactions with the host 102, which may receive borrower, loan, and/or fraud information from a participating lender 106, and the host 102 may store the received information in the database 104. The process 200 may further include interactions with one or more participating lenders 106 requesting from the host 102 information regarding a certain borrower or a pending transaction. In response, the host 102 may retrieve the requested information from the database 104 and transmit the retrieved information to the participating lender 106. Accordingly, the system 100 and process 200 enables participating lenders 106 to more easily request, and review, borrower, loan, and/or fraud data in real time in order to better protect against fraudulent transactions, such as, e.g., fraudulent loan stacking.

In the illustrated embodiment, the process 200 may begin at step 202 with a borrower first initiating a transaction with a participating lender B, for example, by applying for a loan. At step 204, the lender B requests information from the host 102 in response to the newly initiated transaction (e.g., the loan application). For example, the lender B may ask the host 102 to check for recent transaction history, such as, for example, fraud or other loan information, that involves the borrower based on the borrower's personal identity information, device identity information, or other transaction attributes associated with the pending transaction.

In certain embodiments, the host 102, or the data retrieval and processing engine 108 included therein, receives the requests for borrower and other transaction information, such as, e.g., at step 204 of the process 200. The request may originate from a participating member 106, such as, e.g., a financial institution, that desires to retrieve information related to the pending transaction. The requested information may include velocity information, or whether and how recently the same borrower, or other entity with one or more matching transaction attributes, has initiated another transaction (e.g., loan application) with a different financial institution (e.g., creditor). Alternatively or additionally, the requested information may include reported fraud information, or whether the host has any information regarding any fraud-related matters with which the same borrower, or the other entity with one or more matching transaction attributes, has been involved. The transaction information request may include identifying information related to the individual borrower, the borrower's device, or otherwise associated with the transaction (e.g., name, address, social security number, email address, IP address, device tag, etc.), and/or other information that may be used to retrieve credit-related data for the transaction. However, it should be noted that any such data provided to the network remains private. That is, no sharing of leads or customer information occurs within or across the network.

Other examples of transaction-related information that may be included in the request and/or may be retrieved from the database 104 in response thereto may include a market identifier that identifies the type of "product" or the market in which any previous transactions occurred, and a channel identifier that identifies the application channel used in the previous transaction. Exemplary market identifiers can include credit card issuer, unsecured personal lender, home equity line of credit (HELOC), alternative short term lender, auto lender, or any other identifier that enables segregating or aggregating the transaction data on a market level. Exemplary channel identifiers can include web, mobile, bank branch, dealership, retail point-of-conversion (POC), call center, or any other identifier that enables segregating or aggregating the transaction data on a channel level.

In the illustrated embodiment, at step 206, in response to the request for transaction information, the host 102 returns, to lender B, any relevant information available to the network, if any. Specifically, the host 102 retrieves, from the database 104, relevant transaction information, including any reported fraud and/or heightened velocity alerts that are associated with transaction attributes matching the attributes of the currently-pending transaction. In this example embodiment, the host returns no information regarding the pending transaction because no such information was found in the database 104.

In the illustrated embodiment, because no fraud alerts were returned at step 206, Lender B presents an offer (e.g., loan terms) to the borrower, such as at step 208. If the borrower accepts the offer or otherwise chooses to proceed, Lender B reports an updated transaction status to the host 102, such as at step 210. For example, the updated transaction status may include a status code for "Completed" indicating that the borrower has chosen to complete the loan application or otherwise accept the loan terms offered at step 208. The host 102 then stores the borrower information and other transaction-related information received from Lender B in the database 104. This information is now available via the database 104 should another participating lender deal with the same borrower's identity information and/or device or IP address in the future.

For example, in the illustrated embodiment, the borrower initiates a second transaction (e.g., applies for another loan) with Lender C, such as at step 212. Lender C is another participating lender or member 106 of the fraud prevention network system. Lender C asks the host 102 to check for recent transaction history, such as velocity, fraud, and other loan information, involving this borrower or the attributes of this transaction (e.g., personal identity and/or device identity information associated with the transaction or borrower), such as at step 214. The host 102 retrieves any information regarding the borrower and/or transaction stored in the database 104, including information indicating fraud and/or elevated velocity detection. In this example, the host 102 would retrieve information regarding borrower's transaction with Lender B 106. In addition, the host 102 would detect a possible velocity issue based on the short time frame between the two recent transactions. Accordingly, in this example, the host 102 would return a "red flag" to Lender C indicating that one other recent transaction involving the same borrower has been detected and that deeper review is required, such as at step 216. Such a configuration provides the participating lenders with information regarding borrowers that would otherwise be unavailable due to the short period of time between the loans.

It should be appreciated that the information stored in the database 104 is based on information received from participating members 106 while they are conducting transactions such as credit and lending applications with potential borrowers. That is, whenever a participating member 106 is transacting with a borrower, the member 106 issues certain transaction status codes associated with each borrower and the specific transactions. Meanwhile, if another participating lender 106 initiates a transaction involving the same borrower details or device(s), both of the participating lenders 106 will be provided status alerts regarding the fraud risk of the transaction.

In one embodiment, the fraud prevention exchange system uses the following transaction status codes: (1) Placed, (2) Rejected Fraud, (3) Completed, and (4) Reported Fraud. The "Placed" transaction status code is issued upon receiving a first call for verification from a lender 106. The Placed status occurs automatically as soon as a first "Get Decision" call is placed to the host 102, which is the request for transaction or borrower information from the database 104. The Placed Status is not necessarily linked to initiating a transaction or application, but rather to the first step within the application process that requires verification. The "Rejected Fraud" transaction status code is issued when a participating lender reports that a loan associated with a borrower is rejected before approval. This is a proactive status that occurs any time fraud is detected prior to reaching the "Completed" status. That is, after a transaction has been opened, if the transaction is deemed fraudulent before it has logged a "Completed" status, the transaction status will be set to "Rejected Fraud."

The "Completed" transaction status code occurs when the loan review process is completed by the corresponding lender 106 without any finding of fraud (e.g., using the lender's manual review process). Note that the "Completed" status is not necessarily limited to when a loan is approved. Instead, the Completed Status is a proactive status that may be set immediately after a second "Get Decision" call is sent to the host 102, which is a second request for transaction or borrower information from the database 104, regardless of the type of transaction. That is, the Completed status only indicates that the lender 106 had not found any record of a fraud (or suspicion of fraud) associated with the borrower at the time of making the second call for information. In most cases, the Completed status also indicates that the lender 106 is likely to fund the product or approve the loan and/or the borrower intends to move ahead with the loan application, so long as the second call produces clear results.

The final transaction status code is the "Reported Fraud" status. This proactive status is transmitted any time fraud is detected after a transaction status has been set to "Completed." That is, after the second "Get Decision" call and the transaction status is set to "Completed," if the transaction is subsequently deemed fraudulent, then the transaction status should be reset to "Reported Fraud." Note that the "Reported Fraud" status will always be set after the transaction status was previously set to "Completed." In some cases, the Reported Fraud status can be entered after closing the transaction.

In some embodiments, there may also be a transaction status code for a "Funded" status. For example, the Funded status may be entered once funds have been dispersed in the case of a loan or the transaction has otherwise been finalized.

FIG. 3 illustrates an exemplary process 300 for processing or vetting a new application or other transaction using fraud prevention techniques, in accordance with one embodiment. The process 300 is a depiction of a common consumer lending application flow, though many variations exist in the present credit and lending market. The process 300 may be implemented using the fraud prevention exchange system 100, or more specifically, through actions taken by a participating lender 106 and interactions by the participating lender 106 with other components of the system 100, including the database 104 and/or the host 102, the actions and interactions being facilitated by software executing on one or more computer processors associated with each of the system components. In the following paragraphs, the process 300 will be described in conjunction with a description of the components of the system 100.

As described above, in certain embodiments, the fraud prevention exchange system 100 requires the participating members 106 to transmit a transaction status code during the transaction process. For example, after a transaction is initiated, the lender 106 may place or send an initial call or request to the host 102 for verification, such as at step 302 of the process 300. It should be appreciated that in this example embodiment, the first transaction status code "Placed" may have already been transmitted and stored in association with this specific borrower. In some embodiments, the first transaction status code "Placed" is transmitted as soon as a transaction is first initiated, or once verification is requested for the transaction. For example, the Placed status code may be transmitted to the host 102 with the initial call for verification at step 302.

Thereafter, the lender 106 communicates with the host 102 for making the first transaction status decision, such as at step 304. More specifically, the lender 106 determines whether there are any elevated velocity, reported fraud, or other risk alerts associated with a specific borrower or the transaction attributes, such as at step 306. The lender 106 makes this determination based on whether the host 102 returns any transaction status codes previously associated with the specific borrower at step 304. The host 102 returns any risk alerts based on information transmitted by other participating lenders 106 regarding this borrower, including whether there is a heightened velocity in the receipt of transaction status codes from corresponding lenders 106. For example, if the only transaction code transmitted in accordance with this specific borrower is the "Placed" transaction status, this indicates that the specific borrower previously initiated a transaction with another lender 106. In such case, the host 102 considers how recently the other transaction occurred. For example, if the "Placed" status was received within the last week, or other predetermined threshold, the host 102 may return a high velocity risk alert at step 304. Other risk alerts may include "Rejected Fraud," which indicates that a participating lender 106 has reported a fraudulent loan application or transaction associated with the specific borrower prior to approval of the loan or completion of the transaction, and "Reported Fraud," which indicates that a participating member 106 deemed a transaction as being fraudulent after the transaction was assigned a "Completed" status. In some cases, these risk alerts may simply indicate that the same borrower has recently been involved with another transaction. And in other cases, these risk alerts may indicate that a prior transaction with this specific borrower was rejected due to a suspicion of fraud or a confirmation of fraud.

At step 306, if the host 102 returns any risk alert associated with the borrower during the communication at step 304, the decision at step 306 is "Yes" and the lender 106 would conduct business as usual through the lender's own manual review process, such as at step 308. That is, the system 100 has provided the lender 106 with a red flag regarding the borrower, and in response, the lender 106 can conduct a further review as the lender 106 sees fit. Following this step, if the lender's standard review process indicates a transaction as fraudulent, the participating lender 106 would transmit the appropriate transaction status code back to the host using the fraud prevention exchange system 100. That is, as described above, the participating lender would reject the loan prior to approval or completion of the application and transmit the appropriate transaction code indicating "Rejected Fraud," based on the nature of information found. It should be appreciated that through such a configuration, the fraud prevention exchange system 100 enables participating lenders 106 to provide transition status codes that will benefit other participating lenders 106 transacting with the same borrower in real time.

If, on the other hand, the host 102 does not return any risk alerts at step 304, then the decision at step 306 is "No" and the lender 106 proceeds with presenting the loan product to the borrower, such as at step 310. The product presented at step 310 may include APR, rewards, credit lines, and other information associated with the loan terms being offered to the borrower. Over time, the lender 106 will receive and review the borrower's application, such as at step 312. It should be appreciated that the time that lapses between these two steps may vary. Sometimes, the borrower may be presented a loan product within 24 hours of filing an application. Other times, the loan process may take up to a week or more.

After the lender 106 has reviewed the borrower's application, the lender 106 makes a final call to the host 102 for verification of the borrower, such as at step 314. In some embodiments, this final call at step 314 also includes logging, or sending to the host 102, a "Completed Status" for the transaction. In association with the final call, the lender 106 communicates with the host 102 for a second time to make a risk assessment decision, such as at step 316. During this communication, the host 102 transmits to the lender 106 any velocity, fraud, or other loan information involving the borrower and/or attributes associated with the current transaction. In some embodiments, the lender 106 sends the transaction status code for "Completed" to the host 102 during the communication at step 316, instead of at step 314. As described above at step 306, based on any risk alerts or other information returned by the host 102 during the communication at step 316, the lender 106 determines whether there are any high risk alerts associated with the borrower, such as at step 318. If there are any high risk alerts associated with the borrower at this time, the lender 106 again conducts business as usual through a manual review process, such as at step 320. On the other hand, if the host 102 does not return any risk alerts at step 318, the lender 106 may provide the borrower a final offer summary, such as at step 322.

Referring back to step 320, if the participating lender's review results in any new risk alerts, the participating lender 106 rejects the loan prior to approval and transmits the appropriate transaction status code for "Reported Fraud" to the host 102. In some cases, the lender 106 may also provide additional information indicating the nature of the fraud suspected or determined.

It should be appreciated that the "Completed" transaction code is transmitted prior to the actual fulfillment of the loan. This is because the transaction codes associated with the fraud prevention exchange system 100 are related specifically to fraud related information, and detected fraud is only one of many factors considered in any loan approval.

If a lender 106 learns of fraud associated with the borrower after setting the "Completed Status," for example, through the manual review process at step 320, or after funding or approving a loan, the lender 106 may still return to the system 100 to update the database 104. For example, if after the transaction reached "Completed" status and after a final loan decision was made (either approval or denial of the loan) a lender 106 learns or determines that the transaction was in fact fraudulent, the lender 106 can transmit a Transaction Status code for "Reported Fraud" to the database 104 via the host 102. Such a configuration provides necessary information based on fraud confirmed after the completed process to other participating lenders 106.

It should be appreciated, that in this example embodiment, participating lenders 106 will make two requests to the host to receive status information regarding a borrower: (1) upon initiating or origination of a transaction, and (2) just prior to finalizing or closing the transaction. This is beneficial because often, when the participating lender 106 first calls the fraud prevention system 100 (i.e., when the transaction was started), there may have been no matches for reported fraud regarding a specific borrower. However, one to seven days later, at the end of the transaction (i.e., just prior to funding), this could have changed, and the lender 106 needs the current, real time reported fraud level regarding the borrower to make an informed decision.

It should further be appreciated that such a configuration provides the lender 106 with facts regarding whether (and how many times) a borrower involved in the current transaction has been reported in a fraudulent transaction when the lender is determining whether to approve a loan. In the high velocity financial technology industry, lenders 106 need to access the information regarding each borrower at multiple points during the transaction. The fraud prevention exchange system 100 provides real-time, or nearly real-time, responses for lenders 106. By reviewing transaction status codes for prior transaction activity across the fraud prevention network of the present disclosure, the most current information regarding each borrower can be used to identify suspicious fraudulent behavior.

In certain embodiments, the fraud prevention exchange system 100 includes weighted algorithms used to factor in various transaction statuses and/or transaction attributes, and deliver a fraud risk level associated with each transaction. More specifically, in certain embodiments, the fraud prevention exchange system 100 utilizes the information received from each participating lender 106 regarding each borrower as inputs to certain weighted algorithms to provide a fraud risk level associated with the borrower. The transaction attributes applied to these weighted algorithms can comprise, for example, personal information, including social security number, email address, phone number, name, date of birth, home address, and/or other data related to personal identity; digital information, including device tag (e.g., Evercookie), IP address, and/or other data related to device identity, either for a returning device or another device connected to an existing or known device; and location information, including a city associated with the IP address, a country associated with the IP address, or other data related to identifying a location of the transaction. These attributes may be used to match an incoming transaction with previously reported transactions stored in the database 104 and provide an alert if the incoming transaction is identified as having attributes that are associated with heightened velocity or reported fraud alerts.

In some embodiments, the sequence of new transactions or applications in various markets may also be used as a risk indicator by the fraud prevention exchange system 100. For example, a borrower that initiates a credit application, a mortgage application, and an automobile loan application all within quick succession (e.g., with a predetermined time period) may trigger a high risk alert within the system 100 for any lenders 106 requesting information involving that borrower. This is because often fraud criminals who have stolen identities will attempt to get the maximum amount of credit they can quickly before the consumer notices and alerts lenders. Traditional credit reporting cycles may take 45 days or longer for the reporting to catch up, and at times consumers do not realize their identity has been stolen until the accounts have already gone delinquent and the lender makes attempts to collect on the debt. Additionally, fraud criminals that utilize synthetic identities frequently groom the credit profile for months (even years), monitoring it for the moment at which their credit score is sufficient to acquire the best financial services products. They will then quickly apply for loan products, attempting to get the loans prior to batch credit reporting processes catching up.

Thus, to determine a fraud risk level that is based on the types of new transactions, the various markets and/or application channels being used, the sequence of such activities, or a combination thereof, the fraud prevention exchange system 100 may also include weighted algorithms that accept, as inputs, transaction attributes related to market type and channel type. For example, the fraud risk level may be at least partially based on a market attribute that identifies the type of "product" or the market in which the transaction occurred (e.g., credit card issuer, unsecured personal lender, home equity line of credit (HELOC), alternative short term lender, auto lender, etc.), so that the transaction data can be segregated or aggregated data on a market level. As another example, the fraud risk level may be at least partially based on a channel attribute that identifies the application channel used for the transaction (e.g., web, mobile, bank branch, dealership, retail point-of-conversion (POC), call center, etc.), so that the transaction data can be segregated or aggregated on a channel level.

FIG. 4 is a block diagram of a computing device 400 housing executable software used to facilitate the fraud prevention exchange system 100, including one or more components thereof, in accordance with embodiments. One or more instances of the computing device 400 may be utilized to implement any, some, or all of the components in the system 100, such as, for example, the host 102, the database 104 and/or each of the lenders 106. Computing device 400 includes memory element 404, which may include a computer readable medium for implementing the system 100, and/or components thereof, and for implementing particular system interactions. Memory element 404 may also be utilized to implement one or more databases 406, such as, for example, the database 104 for storing transaction and borrower information, as shown in FIG. 1. Computing device 400 also contains executable software, some of which may or may not be unique to the system 100.

In some embodiments, the system 100 is implemented in software, as an executable program, and is executed by one or more special or general purpose digital computer(s), such as a mainframe computer, a personal computer (desktop, laptop or otherwise), personal digital assistant, or other handheld computing device. Therefore, computing device 400 may be representative of any computer in which the system 100 resides or partially resides.

Generally, in terms of the hardware architecture as shown in FIG. 4, computing device 400 includes processor 402, memory 404, and one or more input and/or output (I/O) devices 408 (or peripherals) that are communicatively coupled via a local interface 410. Local interface 410 may be one or more buses or other wired or wireless connections, as is known in the art. Local interface 410 may have additional elements, which are omitted for simplicity, such as controllers, buffers (caches), drivers, transmitters, and receivers to facilitate external communications with other like or dissimilar computing devices. Further, local interface 410 may include address, control, and/or data connections to enable internal communications among the other computer components.

Processor 402 is a hardware device for executing software, particularly software stored in the memory 404. Processor 402 can be any custom made or commercially available processor, such as, for example, a Core series or vPro processor made by Intel Corporation, or a Phenom, Athlon or Sempron processor made by Advanced Micro Devices, Inc. In the case where computing device 400 is a server, the processor may be, for example, a Xeon or Itanium processor from Intel, or an Opteron-series processor from Advanced Micro Devices, Inc. Processor 402 may also represent multiple parallel or distributed processors working in unison.

Memory 404 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). Memory 404 may incorporate electronic, magnetic, optical, and/or other types of storage media. Memory 404 can have a distributed architecture where various components are situated remote from one another, but are still accessed by processor 402. These other components may reside on devices located elsewhere on a network or in a cloud arrangement.

The software in memory 404 may include one or more separate programs. The separate programs comprise ordered listings of executable instructions for implementing logical functions. In the example of FIG. 4, the software in memory 404 may include the system 100, the process 200, and/or the process 300, in whole or in part, in accordance with the present disclosure, and a suitable operating system (O/S) 412. Examples of suitable commercially available operating systems 412 are Windows operating systems available from Microsoft Corporation, Mac OS X available from Apple Computer, Inc., a Unix operating system from AT&T, or a Unix-derivative such as BSD or Linux. The operating system 412 will depend on the type of computing device 400, as will be appreciated. Operating system 412 essentially controls the execution of other computer programs, such as the system 100, and provides scheduling, input-output control, file and data management, memory management, and communication control and related services.

Steps and/or elements, and/or portions thereof, of the techniques described herein may be implemented using a source program, executable program (object code), script, or any other entity comprising a set of instructions to be performed. Furthermore, the software embodying these techniques can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, and Lua. Components of the system 100 may also be written in a proprietary language developed to interact with these known languages.

The I/O device 408 may interact, via the local interface 410, with interactive hardware 414 comprising one or more input devices 416, such as a keyboard, a mouse, a scanner, a microphone, a touch screen, etc. The interactive hardware 414 may also include output devices such as a display 418, a printer, an audio speaker, etc. The interactive hardware 414 may also comprise devices that communicate with the inputs or outputs, such as a communications module 420 comprising one or more of a short-range transceiver (RFID, Bluetooth, etc.), a telephonic interface, a cellular communication port, a router, or other types of network communication equipment. The interactive hardware 414 may be internal to computing device 400, or may be external and connected wirelessly or via connection cable, such as through a universal serial bus port.

When computing device 400 is in operation, processor 402 is configured to execute software stored within memory 404, to communicate data to and from memory 404, and to generally control operations of computing device 400 pursuant to the software. The system 100, the process 200, and/or the process 300, and operating system 412, in whole or in part, may be read by processor 402, buffered within processor 402, and then executed.

In the context of this document, a "computer-readable medium" may be any means that can store, communicate, propagate, or transport data objects for use by or in connection with the system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. Portions of the system 100, the process 200, and/or the process 300 can be embodied in any type of computer-readable medium for use by or in connection with an instruction execution system or apparatus, such as a computer.

Referring back to FIG. 1, in some embodiments, the host 102, the database 104, and/or each of the participating lenders 106, in whole or in part, can be implemented as computer software modules stored in a memory and operating on one or more processors associated with the system 100 or components thereof. For example, a transaction verification module (not shown) may be configured, using computer software instructions stored in the memory 404 and executing on the processor 402, to carry out the operations of the process 300 and/or portions of the process 200 (e.g., steps 204, 208, 210, and/or 214). In such cases, the transaction verification module may be included on, or operatively coupled to, one or more computing devices 400 associated with the participating lenders 106, and may be in communication with, or have access to, the database 104 and/or the host 102. Likewise, in some cases, a fraud prevention module (not shown) may be configured to carry out one or more of the operations included in the process 200 (e.g., the steps 206 and/or 216) and other operations related to providing transaction information and/or high risk alerts to the participating lenders 106. In such cases, the fraud prevention module may include the data retrieval and processing engine 108, may be included on, or operatively coupled to, one or more computing devices 400 associated with the host 102, and may be in communication with, or have access to, the database 104 and/or each of the participating lenders 106.

For purposes of connecting to other computing devices, computing device 400 is equipped with network communication equipment and circuitry. In a preferred embodiment, the network communication equipment includes a network card such as an Ethernet card, or a wireless connection card. In a preferred network environment, each of the plurality of computing devices 400 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 400 to have a broadband or wireless connection to the Internet (such as DSL, Cable, Wireless, T-1, T-3, OC3 or satellite, etc.), the principles described herein are also practicable with a dialup connection through a standard modem or other connection means. Wireless network connections are also contemplated, such as wireless Ethernet, satellite, infrared, radio frequency, Bluetooth, near field communication, and cellular networks.

Thus, the fraud prevention exchange techniques described herein provide a unique, technical solution to several technical problems, including: (1) collecting and sharing transaction risk assessment data across a wide variety of creditors and lenders that would not otherwise interact or communicate (i.e. due to being competitors or within completely different industries or markets), while maintaining the anonymity of these businesses; and (2) identifying, in real-time, fraudulent transactions occurring in rapid succession across different application channels and markets that normally use different products for risk assessment or suspected fraud reporting. The exemplary systems and methods described herein combine digital and personal identity verification tools with a database configured to store transaction data received from participating members of a fraud prevention exchange network without revealing sensitive information to other members, and a data retrieval and processing engine configured to evaluate real-time fraud risk for a new transaction based on the stored data, including prior fraud reports and velocity attributes determined from the stored data. In particular, the data retrieval and processing engine assigns a generic or uniform transaction status code to each pending transaction depending on certain characteristics of the transaction, including whether or not the specific consumer or transaction element is associated with a known fraud (e.g., rejected fraud, reported fraud, etc.) and where the transaction is in the application process (e.g., Placed, Completed, etc.). Based on these transaction status codes and information associated therewith, including, for example, the timing of each code, the types of codes, the total number of codes, etc., the data retrieval and processing engine may generate a risk alert that indicates either potential fraud or heightened velocity for a given transaction, but does not indicate how this assessment was reached, i.e. which businesses provided the previous transaction information. Thus, the techniques described herein provide a new type of risk alert that is based on data from multiple sources, in real time, and can be distributed back to those sources while maintaining the anonymity of all involved.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A fraud prevention exchange system for gathering transaction data for centralized review, comprising:
   a database for storing transaction data received from a plurality of participating entities; and
   a data retrieval and processing engine in communication with the database and the plurality of participating entities, each participating entity being associated with a computing device comprising software application configured to communicate with the data retrieval and processing engine, wherein the data retrieval and processing engine is configured to:
   receive transaction data for a first pending transaction from a first entity of the plurality of participating entities, the first pending transaction being associated with one or more transaction attributes;
   assign a first transaction status code to the first pending transaction and to each of the one or more transaction attributes associated with the first pending transaction;
   store the received transaction data and the first transaction status code in the database, the storing including storing the first transaction status code in association with each of the one or more transaction attributes;
   receive, from a second, different entity of the plurality of participating entities, a transaction verification request for a second pending transaction comprising at least one of the one or more transaction attributes associated with the first pending transaction;
   prior to completion of the second pending transaction, generate one or more alerts for the at least one of the one or more transaction attributes based on the first transaction status code and one or more prior transaction status codes previously stored in the database in association with said attribute; and
   provide the one or more generated alerts to the computing device associated with the second entity to complete the second pending transaction, wherein the one or more generated alerts activate the software application in said computing device to cause the one or more generated alerts to display on the computing device of the second entity and enable connection to the data retrieval and processing engine to provide an updated transaction status code for the completed second pending transaction to the data retrieval and processing engine for storing in the database in association with the at least one of the one or more transaction attributes.

2. The system of claim 1, wherein the one or more alerts are further determined based on a total number of transaction status codes stored in the database in association with the at least one of the one or more transaction attributes within a predetermined time period.

3. The system of claim 2, wherein the one or more alerts includes a velocity alert, and the data retrieval and processing engine is configured to generate the velocity alert if the total number of transaction status codes within the predetermined time period exceeds a first predetermined threshold.

4. The system of claim 1, wherein the one or more alerts are further determined based on a total number of transaction status codes of a predetermined type that are stored in the database in association with the at least one of the one or more transaction attributes.

5. The system of claim 4, wherein the one or more alerts are further determined by calculating a weighted score for the second pending transaction, the calculating including applying a respective one of a plurality of weights to each type of transaction status code stored in the database in association with the at least one of the one or more transaction attributes.

6. The system of claim 5, wherein the one or more alerts includes a velocity alert, and the data retrieval and processing engine is configured to generate the velocity alert if the weighted score exceeds a predetermined threshold.

7. The system of claim 1, wherein the one or more alerts includes a reported fraud alert, and the data retrieval and processing engine is configured to generate the reported fraud alert if at least one of the first transaction status code and the one or more prior transaction status codes indicates a finding of possible fraud in association with the at least one of the one or more transaction attributes.

8. The system of claim 1, wherein the one or more alerts includes a reported fraud alert, and the data retrieval and processing engine is configured to generate the reported fraud alert if a percentage of matching transaction attributes exceeds a predetermined threshold.

9. The system of claim 1, wherein the transaction attributes associated with the first pending transaction includes digital information identifying a device associated with the pending transaction.

10. The system of claim 1, wherein the transaction attributes associated with the first pending transaction includes personal information identifying a person associated with the pending transaction.

11. The system of claim 1, wherein the transaction attributes associated with the first pending transaction includes location information identifying a geographical location associated with the pending transaction.

12. A method of facilitating fraud prevention for pending transactions involving a plurality of participating entities in communication with a host, the method comprising:
receiving transaction data at the host for a first pending transaction from a first entity of the plurality of participating entities, wherein the received data includes a first transaction status code assigned to the first pending transaction and one or more transaction attributes associated with the first pending transaction;
storing the received transaction data in a database in communication with the host, the storing including storing the first transaction status code in association with the one or more transaction attributes;
receiving, at the host, a first transaction verification request for a second pending transaction from a second, different entity of the plurality of participating entities, the request comprising at least one of the one or more transaction attributes associated with the first pending transaction;
prior to completion of the second pending transaction, generating, using the host, a first alert for the at least one of the one or more transaction attributes based on the first transaction status code and any transaction status codes previously stored in the database in association with said attribute; and
providing the generated first alert to the second entity at a first point in time to complete the second pending transaction, wherein the generated first alert activates software application stored in a computing device associated with the second entity to cause the generated first alert to display on said computing device and enable connection to the data retrieval and processing engine to provide an updated transaction status code for the completed second pending transaction to the data retrieval and processing engine for storing in the database in association with the at least one of the one or more transaction attributes.

13. The method of claim 12, further comprising:
after the first point in time, receiving, at the host, a second transaction verification request from the first entity in association with the first pending transaction;
storing information contained in the second transaction verification request in the database in association with the one or more transaction attributes of the first pending transaction;
generating, using the host, a second alert based on the first transaction status code, the second transaction verification request, the first transaction verification request from the second entity, and any transaction status codes previously stored in the database in association with the one or more transaction attributes of the first pending transaction; and
providing the second alert to the first entity at a second, later point in time, wherein the second alert activates software stored in a computing device associated with the first entity to cause the second alert to display on said computing device.

14. The method of claim 13, wherein the first transaction status code indicates initiation of a verification process for the first pending transaction by the first entity, and the second transaction verification request includes a second transaction status code indicating completion of an internal review of the first pending transaction by the first entity.

15. The method of claim 14, wherein the second alert includes a reported fraud alert indicating that at least one of the plurality of participating entities submitted a third transaction status code indicating a finding of fraud in association with the at least one of the one or more transaction attributes.

16. The method of claim 15, wherein the third transaction status code is received before the second transaction verification request and after receipt of the first transaction status code.

17. The method of claim 12, wherein the first alert is further determined based on a number of transaction status codes stored in the database in association with the at least one of the one or more transaction attributes within a predetermined time period.

18. The method of claim 17, wherein the first alert includes a velocity alert indicating that the number of transaction status codes within the predetermined time period exceeds a first predetermined threshold.

19. The method of claim 18, wherein the first transaction status code indicates initiation of a verification process for the first pending transaction by the first entity, the first transaction verification request includes a fourth transaction status code indicating initiation of a verification process for the second pending transaction by the second entity, and both transaction status codes are received within the predetermined time period.

20. The method of claim 12, wherein the transaction attributes associated with the first pending transaction includes digital information identifying a device associated with the pending transaction and personal information identifying a person associated with the pending transaction.

* * * * *